United States Patent [19]

Kelley

[11] 4,010,805
[45] Mar. 8, 1977

[54] FLOW THROUGH BRUSH CUTTER

[76] Inventor: Leon O. Kelley, 916 Texas St., Stamford, Tex. 79553

[22] Filed: Apr. 29, 1974

[21] Appl. No.: 464,969

[52] U.S. Cl. .............................. 172/698; 37/2.12; 254/189
[51] Int. Cl.² .................. A01B 13/00; A01B 35/20
[58] Field of Search .................... 172/698, 19, 808; 37/2.12; 254/189, 144

[56] References Cited

UNITED STATES PATENTS

| | | | |
|---|---|---|---|
| 2,154,970 | 4/1939 | Briggs | 172/698 |
| 2,184,688 | 12/1939 | Bleu | 172/808 |
| 2,655,089 | 10/1953 | Tourneau | 172/698 X |
| 2,660,938 | 12/1953 | Kaupke | 172/698 X |
| 3,022,836 | 2/1962 | Bechman | 172/698 |
| 3,032,123 | 5/1962 | Brown | 37/2 R X |
| 3,207,232 | 9/1965 | Bechman | 172/698 X |
| 3,243,162 | 3/1966 | Potts et al. | 254/189 |
| 3,512,276 | 5/1970 | Juhl | 172/698 X |

Primary Examiner—Stephen C. Pellegrino
Attorney, Agent, or Firm—Richards, Harris & Medlock

[57] ABSTRACT

A flow-through brush cutter is mounted on a tracked vehicle and includes a thin, flat blade having a replaceable V-shaped forward cutting edge and adapted for movement along a horizontal plane disposed beneath the surface of the earth. A pair of thin legs extend upwardly from spaced points on the blade and are connected to the track assemblies of the vehicle by a pair of forwardly extending arms. The horizontal positioning of the blade is controlled by a fluid-powered cylinder mounted on a subframe secured to the frame of the vehicle and a cable system actuated by the fluid-powered cylinder and connected to the arms. Lateral displacement of the blade is controlled by guide members extending on opposite sides of the arms and secured to the track assemblies of the vehicle and to the subframe. The guide members are secured to the subframe by means of pin and slot connections which accommodate relative movement between the frame and the track assemblies of the vehicle.

11 Claims, 5 Drawing Figures

FLOW THROUGH BRUSH CUTTER

FIELD OF THE INVENTION

This invention relates generally to brush cutters, and more particularly to a flow-through brush cutter characterized by the ability to operate continuously without becoming clogged with vegetation, etc.

BACKGROUND OF THE INVENTION

Brush cutters are utilized in conjunction with such construction activities as cable laying, road building, and the like. Brush cutters are also utilized in farming to clear fields prior to planting. Although various brush cutter designs have been proposed heretofore, prior art brush cutters have generally lacked the ability to operate on a continuous basis due to the fact that they have tended to become clogged with vegetation and other debris resulting from the brush cutting operation. Thus, a need exists for a brush cutting characterized by the ability of vegetation and debris resulting from the brush cutting operation to flow directly through the device thereby facilitating its continuous operation.

SUMMARY OF THE INVENTION

The present invention comprises a flow-through brush cutter which overcomes the foregoing and other disadvantages long since associated with the prior art. In accordance with the broader aspects of the invention, a brush cutter comprises a generally V-shaped blade adapted for movement along a horizontal plane extending beneath the surface of the earth. Legs extend upwardly from spaced points on the blade and are characterized by a thin cross-section in the direction extending transversely to the direction of the movement of the blade. The brush cutter is driven by a vehicle, and the upper ends of the legs are detachably connected to the vehicle by forwardly extending arms. The vertical positioning of the blade is controlled by a fluid-powered cylinder and a cable system connected between the cylinder and the arms.

In accordance with more specific aspects of the invention, the fluid-powered cylinder is mounted on a subframe connected to the frame of the vehicle. A beam is mounted on the fluid-powered cylinder and in turn supports a pair of rollers. The cable system includes a pair of cables each connected to the frame and extending around one of the rollers on the beam and around rollers mounted on the subframe at elevated locations and connected at its opposite end to one of the arms.

In accordance with still other aspects of the invention, excessive lateral displacement of the blade is controlled by guide members extending on opposite sides of the arms. The vehicle comprises a tracked vehicle, and the guide members are connected to the subframe and to the track assemblies of the vehicle. The connection of the guide members to the subframe comprise pin and slot connections, thereby accommodating relative movement between the frame of the vehicle and the track assemblies.

DESCRIPTION OF THE DRAWINGS

A more complete understanding of the invention may be had by referring to the following Detailed Description when taken in conjunction with the accompanying Drawings, in which.

DETAILED DESCRIPTION

Figure 1:
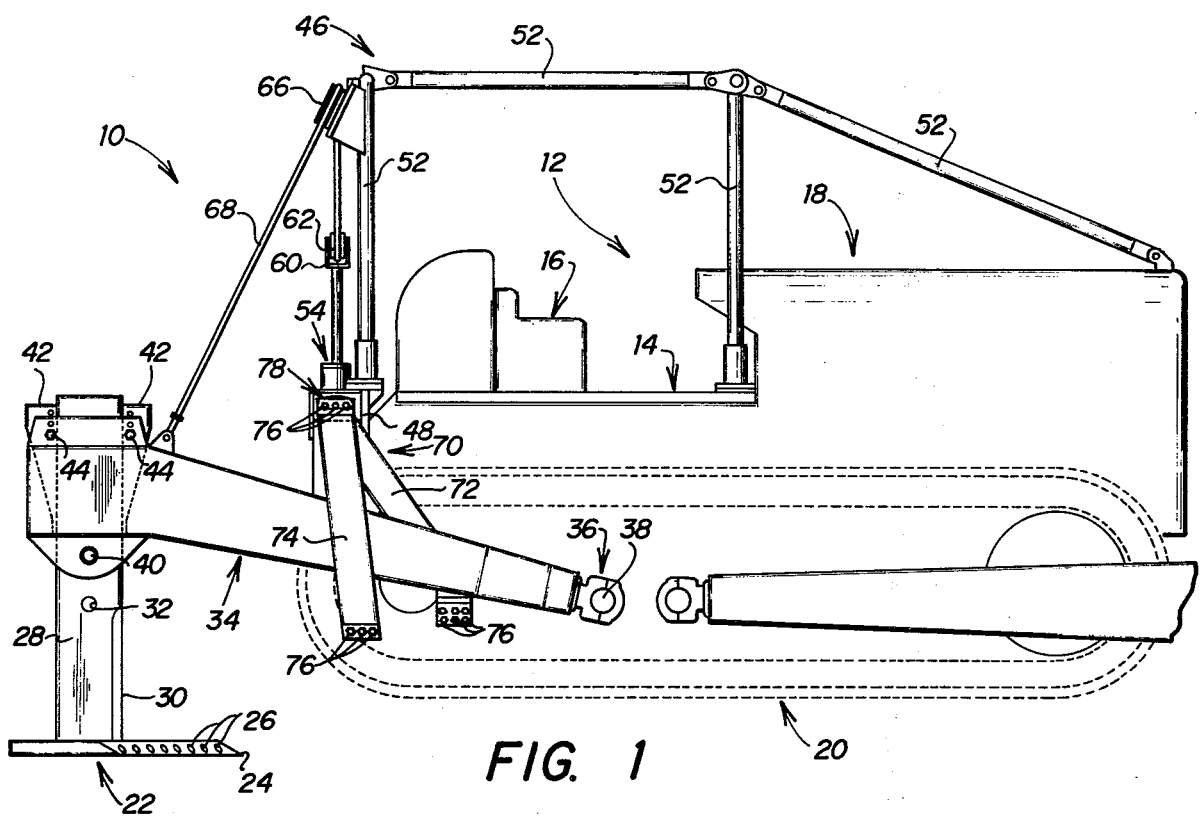
FIG. 1 is a side view of a flow-through brush cutter incorporating the invention.

Referring now to the Drawings, in particular to FIG. 1 thereof, there is shown a flow-through brush cutter 10 incorporating the invention. The brush cutter 10 is mounted on a vehicle 12 comprising one of the commercially available tracked vehicles. The vehicle 12 has a frame 14 and includes an operator compartment 16 and an engine compartment 18. A pair of track assemblies 20 are mounted on opposite sides of the vehicle 12 and function to propel the vehicle under the action of an engine housed within the compartment 18.

Figure 2:
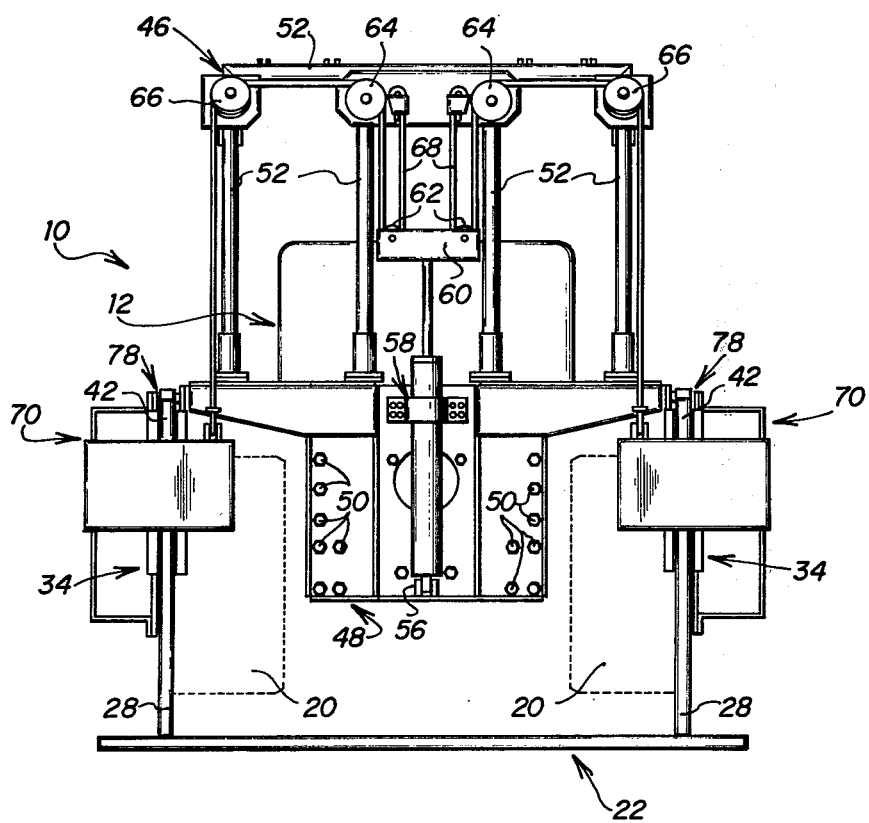
FIG. 2 is a rear view of the flow-through brush cutter.
Figure 3:
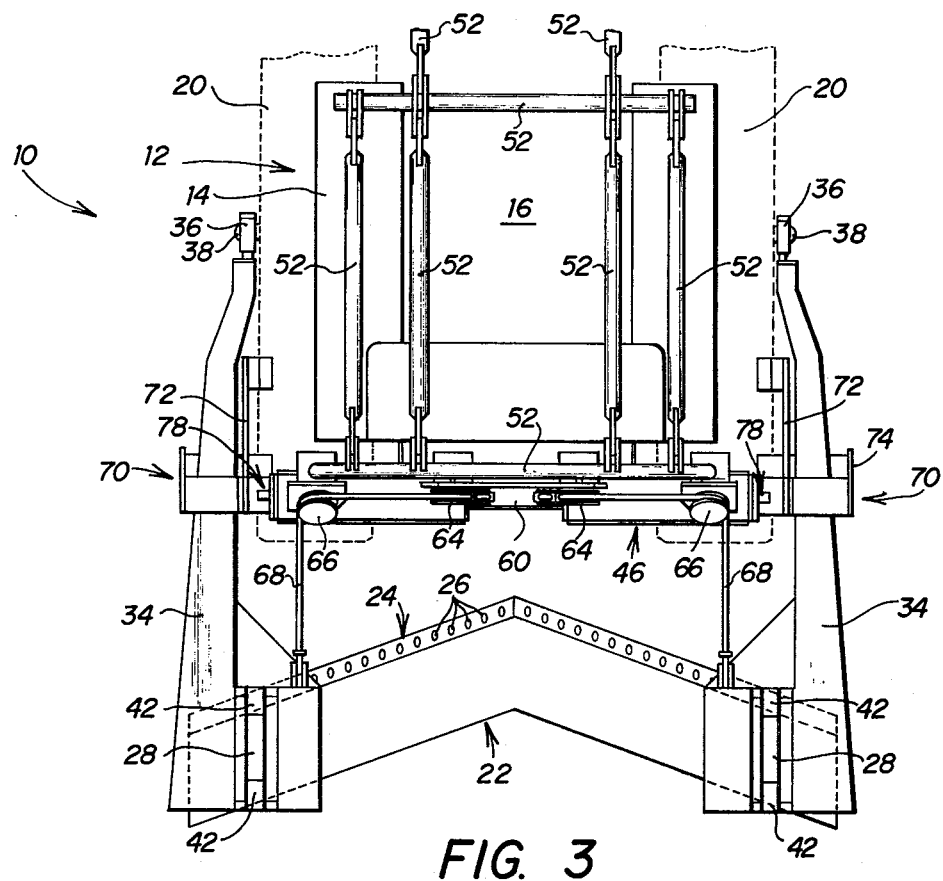
FIG. 3 is a top view of the flow-through brush cutter.

Referring concurrently to FIGS. 1, 2 and 3, the flow-through brush cutter 10 includes a generally V-shaped blade 22. The blade 22 comprises a thin, flat member adapted for movement along a horizontal plane disposed beneath the surface of the earth. The blade 22 has a replaceable forward cutting edge 24 which is secured to the blade by means of bolts 26.

A pair of legs 28 are secured to the blade 22 and extend upwardly therefrom at spaced points adjacent the opposite ends of the blade. Each leg 28 has a V-shaped front edge 30 in the region adjacent the blade 22. The upper ends of the legs 28 comprise a plurality of vertically spaced mounting apertures 32.

The blade 22 is connected to the vehicle 12 by means of a pair of arms 34. The forward ends of the arms 34 are pivotally connected to the track assemblies 20 of the vehicle 12 by means of bearings 36 which receive pins 38. The rear portions of the arms 34 receive the legs 28 and are connected thereto by means of pins 40 which are received in the apertures 32. This permits selective adjustment of the vertically positioning of the blade 22 relative to the arms 34. The angular positioning of the blade 22 is regulated by wedge members 42 which are also received in the rear portions of the arms 34 on opposite sides of the legs 28. The wedge members 42 are retained by means of fasteners 44.

The flow-through brush cutter 10 further includes a subframe 46 mounted on the frame 14 of the vehicle 12. As is best shown in FIG. 2, the subframe 46 includes a plate 48 which is secured to the frame 14 of the vehicle 12 by means of a plurality of fasteners 50. The subframe further includes a plurality of tubular members 52. The tubular members 52 extend over the operators compartment 16 and then forwardly to a connection at the extreme front end of the engine compartment 18.

Referring to FIG. 2, a fluid-powered cylinder 54 is secured to the plate 48 of the subframe 46 by means of a clevis 56 and a bracket 58. The fluid-powered cylinder 54 may comprise either a hydraulic cylinder or a pneumatic cylinder in accordance with particular requirements. A beam 60 is mounted on the fluid-powered cylinder 54 for actuation thereby. A pair of rollers 62 are rotatably supported on the beam 60.

A pair of rollers 64 and a pair of rollers 66 are all rotatably supported on the subframe 46 at elevated locations relative to the remaining components of the brush cutter 10. A pair of cables 68 are each secured at one end to the subframe 46. Each cable 68 then extends around one of the rollers 62 of the beam 60, around one of the rollers 64, around one of the rollers 66, and is secured at its opposite end to one of the arms 34. It will be noted that the rollers 64 are positioned to receive the cable 68 from the roller 62, and that the rollers 66 are positioned to direct the cable 68 to the points of attachment to the arms 34.

It will thus be understood that the fluid-powered cylinder 54 operates through a cable system comprising the beam 60, the rollers 62, the rollers 64, the rollers 66, and the cables 68 to control the vertical positioning of the blade 22. This is advantageous in that such vertical positioning is effected by means of a single fluid-powered cylinder. Also, the particular design of the cable system assures that equal tension is applied to both cables 68, thereby assuring the positioning of the blade 22 in a horizontal plane.

Those skilled in the art will appreciate the fact that since the arms 34 are pivotally connected to the vehicle 12 by means of the bearings 36 and the pins 38, actuation of the fluid-powered cylinder 54 to raise or lower the blade 22 will initially position the blade in a non-horizontal orientation. However, the blade 22 is easily restored to a perfectly horizontal orientation by adjusting the positioning of the wedge members 42 on opposite sides of the legs 28.

The flow-through brush cutter 10 further includes a pair of guide assemblies 70. As is best shown in FIG. 3, the guide assemblies 70 are disposed on opposite sides of the subframe 46 and receive the arms 34. By this means, the guide assemblies 70 function to prevent substantial lateral displacement of the blade 22 even though the blade encounters obstructions in the earth, etc.

Figure 4:
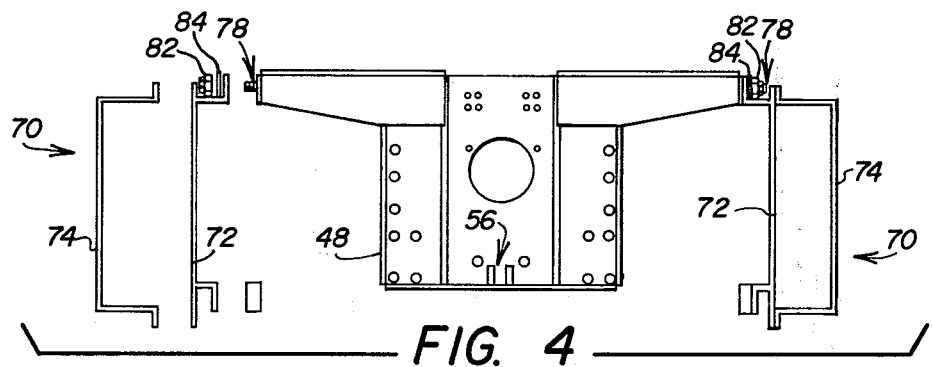
FIG. 4 is an exploded view illustrating the subframe and the guide members of the flow-through brush cutter.
Figure 5:
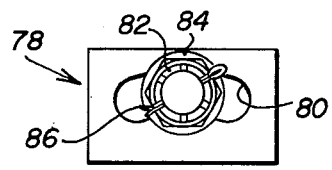
FIG. 5 is an illustration of the bracket interconnecting the subframe and the guide members of FIG. 4.

Referring to FIG. 4, each guide assembly 70 includes an inboard member 72 and an outboard member 74. As is best shown in FIG. 1, the upper and lower ends of the inboard and outboard members 72 and 74 of each guide assembly 70 are secured one to another by means of bolts 76. The lower ends of the members are in turn secured to the track assembly 20 of the vehicle 12 by means of welding. The upper ends of the members comprising each guide assembly 70 are secured to the subframe 46 by means of a pin and slot connection 78, the slot 80 of which is illustrated in FIG. 5. The assembly 70 is retained by a castellated nut 82 and a washer 84, and the nut 82 is retained by a pin 86. The use of pin and slot connections to connect the guide assemblies 70 to the subframe 46 is considered essential in the practice of the invention in that it permits connection of the guide assemblies to the frame and to the track assemblies of the vehicle 12 while accomodating relative movement between the frame and the track assemblies.

From the foregoing it will be understood that the present invention relates to a flow-through brush cutter incorporating numerous advantages over the prior art. Perhaps the most important advantage deriving from the use of the invention relates to the fact that brush cutters constructed in accordance therewith comprise a flow-through design which does not become clogged with vegetation and other debris resulting from the brush cutting operation. Another advantage involves the use of a fluid-powered cylinder and a cable system to regulate the vertical positioning of the blade of a brush cutter. Such construction is both more economical to manufacture and use and considerably less subject to malfunction than are the blade positioning mechanisms characteristic of prior art brush cutters. A further advantage in the use of the invention relates to the use of guide assemblies for preventing undue lateral displacement of the blade which might otherwise result from the blade encountering obstructions in the earth, etc.

Although preferred embodiments of the invention have been illustrated in the accompanying Drawings as described in the foregoing Detailed Description, it will be understood that the invention is not limited to the embodiments disclosed, but is capable of numerous rearrangements, modifications, and substitutions in parts and elements without departing from the spirit of the invention.

What is claimed is:

1. A flow-through brush cutter for attachment to a vehicle comprising:
    a generally thin, flat blade adapted for movement along a generally horizontal plane extending beneath the surface of the earth;
    a pair of legs secured to and extending upwardly from spaced points on the blade, each of said legs having a substantially thin cross-section in the direction extending transversely to the direction of movement of the blade;
    a pair of arms detachably secured to the upper ends of the legs and extending forwardly therefrom;
    means pivotally connecting the forward ends of the arms to the vehicle;
    fluid-powered cylinder means;
    a subframe mounted on the vehicle;
    means mounting said fluid-powered cylinder means on said subframe;
    rollers mounted on said subframe at elevated positions;
    a beam mounted on said fluid-powered cylinder means for actuation thereby;
    a pair of rollers mounted at spaced points on said beam; and
    a pair of cables each secured at one end to said subframe and extending around one of the rollers of said beam and around at least one roller mounted on said subframe at an elevated location and connected at the opposite end to one of the arms wherein the vertical positioning of the blade may be controlled.

2. The flow-through brush cutter according to claim 1 further characterized by:
    a generally V-shaped detachable forward cutting edge on the blade;
    V-shaped forward edges on the legs, at least in the region adjacent to the blade; and
    means for adjusting the vertical positioning of the legs and the blade relative to the arms.

3. A flow-through brush cutter for attachment to a vehicle comprising:
    a blade extending to a generally V-shaped forward cutting edge and adapted for movement along a horizontal plane beneath the surface of the earth;
    a pair of legs secured to and extending upwardly from spaced points on the blade;
    a pair of arms each pivotally connected to the vehicle and connected to the legs, whereby the vehicle operates through the arms and legs to tow the blade along the horizontal plane;

fluid-powered cylinder means connected to the frame of the vehicle;
a beam secured to the fluid-powered cylinder means for actuation thereby;
a pair of rollers mounted on the beam;
at least two rollers mounted at substantially elevated points;
a pair of cables each secured at one end and each extending around one of the rollers mounted on the beam, around at least one of the rollers mounted at elevated points, and connected at the other end to one of the arms, wherein the vertical position of the blade may be varied; and
guide means secured to the frame of the vehicle and receiving the arms therethrough for restricting lateral displacement of the blade due to engagement thereof with obstructions in the earth.

4. The flow-through brush cutter according to claim 3 wherein the blade is a thin, flat member extending to a replaceable forward cutting edge and wherein the legs each comprise a thin cross-section in the direction extending transversely to the direction of movement of the blade and each leg has a V-shaped forward edge at least in the region adjacent to the blade.

5. A flow-through brush cutter comprising:
a vehicle having a frame;
a pair of arms pivotally connected to the frame of the vehicle and extending rearwardly therefrom;
a pair of legs each depending from one of the arms and each having a substantially narrow cross-section in the direction extending transversely to the direction of movement of the vehicle;
a generally thin, flat blade extending to a V-shaped forward cutting edge and secured to the lower end of the legs for movement along a substantially horizontal plane extending beneath the surface of the earth under the action of the vehicle;
a subframe secured to the frame of the vehicle;
fluid-powered cylinder means secured to the subframe;
a beam secured to the fluid-powered cylinder means for actuation thereby and supporting a pair of rollers;
at least two rollers mounted on the vehicle at substantially elevated locations;
a pair of cables each secured at one end and extending therefrom around one of the rollers on the beam and around at least one of the elevated rollers and connected at the opposite end to one of the arms; and
guide means connected to the frame of the vehicle and to the subframe and receiving the arms therethrough for preventing excessive lateral displacement of the blade due to engagement thereof with obstructions in the earth.

6. The flow-through brush cutter according to claim 5 wherein the blade has a replaceable forward cutting edge, wherein the legs have V-shaped forward edges at least in the region adjacent to the blade, and further including means for selectively varying the vertical position of the legs and the blade relative to the arms.

7. The flow-through brush cutter according to claim 6 further including wedge members received between the arms and the legs for selectively varying in angular positioning of the blade.

8. The flow-through brush cutter according to claim 5 wherein each of the cables passes over two rollers mounted at substantially elevated locations, one of said rollers positioned to receive the cable from one of the rollers on the beam and the other of said rollers positioned to direct the cable to one of the arms.

9. A flow-through brush cutter comprising:
a generally thin, flat blade adapted for movement along a generally horizontal plane extending beneath the surface of the earth;
a pair of legs secured to and extending upwardly from spaced points on the blade, each of said legs having a substantially thin cross-section in the direction extending transversely to the direction of movement of the blade;
a pair of arms detachably secured to the upper ends of the legs and extending forwardly therefrom;
a vehicle having a frame and having track assemblies on the opposite sides thereof;
means pivotally connecting the forward ends of the arms to the vehicle;
fluid-powered cylinder means mounted on the vehicle;
means actuated by the fluid-powered cylinder means and connected to the arms for controlling the vertical positioning of the blade,
guide members for controlling the lateral displacement of the blade including members disposed on opposite sides of each arm and connected at their upper ends to the frame of the vehicle and at their lower ends to the adjacent track assembly of the vehicle;
said connections of the guide members to the frame of the vehicle comprising pin and slot connections which accommodate relative movement between the frame and the track assemblies of the vehicle.

10. A flow-through brush cutter comprising:
a blade extending to a generally V-shaped forward cutting edge and adapted for movement along a horizontal plane beneath the surface of the earth;
a pair of legs secured to and extending upwardly from spaced points on the blade;
a vehicle having a frame and having track assemblies on the opposite sides thereof;
a pair of arms each pivotally connected to the vehicle and connected to the legs, whereby the vehicle operates through the arms and legs to tow the blade along the horizontal plane;
fluid-powered cylinder means connected to the frame of the vehicle;
cable means actuated by the fluid-powered cylinder means for controlling the vertical positioning of the blade relative to the vehicle;
the fluid-powered cylinder means and the cable means mounted on the vehicle by means of a subframe secured to the frame of the vehicle; and
guide means including guide members extending on each side of each arm and secured between the adjacent track assembly and the subframe and receiving the arms therethrough for restricting lateral displacement of the blade due to the engagement thereof with obstructions in the earth, said guide members being connected to the subframe by means of a pin and slot connection to accommodate relative movement between the track assemblies and the frame of the vehicle.

11. A flow-through brush cutter comprising:
a vehicle having a frame and track assemblies on opposite sides thereof;
a pair of arms pivotally connected to the frame of the vehicle and extending rearwardly therefrom;

a pair of legs each depending from one of the arms and each having a substantially narrow cross-section in the direction extending transversely to the direction of movement of the vehicle;

a generally thin, flat blade extending to a V-shaped forward cutting edge and secured to the lower end of the legs for movement along a substantially horizontal plane extending beneath the surface of the earth under the action of the vehicle;

a subframe secured to the frame of the vehicle;

fluid-powered cylinder means secured to the subframe;

cable means actuated by the fluid-powered cylinder means and connected to the arms for controlling the vertical position of the blade; and guide means connected to the frame of the vehicle and to the subframe and receiving the arms therethrough for preventing excessive lateral displacement of the blade due to engagement thereof with obstructions in the earth, said guide means being further characterized by members extending on opposite sides of each arm and connected at their lower ends to one of the track assemblies of the vehicle and connected at their upper end of the subframe, said connection at the upper end comprising means for accommodating a predetermined amount of relative movement between the track assembly and the frame of the vehicle.

* * * * *